United States Patent

Yamada et al.

Patent Number: 5,426,868
Date of Patent: Jun. 27, 1995

[54] METHOD FOR MAKING A FLUID BED FURNACE HAVING AN EXTERNAL CIRCULATION SYSTEM

[75] Inventors: Naotake Yamada; Yasunari Okino; Minoru Morita; Yasuhiko Kamijo; Yoshinobu Sato; Tosio Kamimura, all of Tokyo, Japan

[73] Assignee: Tsukishima Kikai Co., Ltd., Tokyo, Japan

[21] Appl. No.: 281,855

[22] Filed: Jul. 28, 1994

Related U.S. Application Data

[63] Continuation of Ser. No. 966,938, Oct. 27, 1992, abandoned.

Foreign Application Priority Data

Oct. 28, 1991 [JP] Japan .................. 3-281568

[51] Int. Cl.⁶ .............. F26B 3/08; F26B 3/10
[52] U.S. Cl. .................. 34/591; 34/282; 364/477
[58] Field of Search ........... 34/282, 591; 364/477

[56] References Cited

U.S. PATENT DOCUMENTS

| | | | |
|---|---|---|---|
| 4,103,646 | 8/1978 | Yerushaimi et al. | 123/4 |
| 4,817,540 | 4/1989 | Razbin et al. | 110/266 |
| 4,936,770 | 6/1990 | Abdulally | 432/58 |

Primary Examiner—Henry A. Bennet
Assistant Examiner—Siddharth Ohri
Attorney, Agent, or Firm—Biebel & French

[57] ABSTRACT

The present invention provides a method for making an external circulation fluid bed furnace which does not require a chamber for retaining heat transporting medium communicating with the down comer. According to the method of the present invention, said chamber is eliminated by properly determining the dimension of the down comer etc. According to the present invention, the ratio of the diameter of the down comer to the diameter of the riser so that the ratio (X) thereof falls in an area between two lines described as follows, in a Ws-X plane:

$$Ws = 12500X^5 - 12080X^4 + 4370X^3 - 600X^2 + 36X$$

and $$Ws = 5800X^4 + 1600X^3 - 580X^2 + 44X$$

wherein, Ws is flow rate of solid heat transport medium in the riser at each unit area the cross section (kg/m² sec); X is a ratio of the diameter of down comer (d) to the diameter of riser (D).

7 Claims, 6 Drawing Sheets

METHOD FOR MAKING A FLUID BED FURNACE HAVING AN EXTERNAL CIRCULATION SYSTEM

This is a continuation of Ser. No. 07/966,938 filed Oct. 27, 1992, now abandoned.

BACKGROUND OF THE INVENTION

1. Field of the Invention

The present invention relates to a method for making a fluid bed furnace having an external circulating system for use in various facilities used for purposes such as incinerating or burning, drying or vaporization, or heat decomposition.

2. Prior Art

A fluid bed furnace having an external circulation system (called as "a fluid bed type furnace" hereafter) comprises a riser or a heating vessel of a cylindrical shape in which a fluid bed is formed by installing solid particles therein as heat transporting material, for heating material thereby for the purpose of burning, drying, vaporizing or decompositing the material. The heat transporting material are drawn out from an outlet pipe equipped at the top of the riser, and sent to a cyclone separator equipped at the end of the outlet pipe to be returned the lower portion of the riser by way of a downcomer. In this type of furnace, a smooth operation can be done such as heating of materials, reaction between materials, or drafting of the products by circulating the heat transporting material as described above.

However, the fluid bed furnace has a common problem to be solved in general in obtaining a smooth circulation of the heat transporting material as well as in controlling the quantity thereof. It is essential to obtain a smooth circulation of the heat transporting material for realization of the quantity control thereof. This realization of smooth circulation of solid particles mostly depends on the design of the downcomer. Namely, it is important to correctly select the height level of an end connection which opens at the lower part of a riser, and then it is important to determine the size of the downcomer in relation to the selected height level.

In the conventional technology, such determination of height level of the end connection and determination of the size of the downcomer were performed under totally different ideas from each other. That is, the former is determined from the total amount of the heat transporting material installed in the furnace, and the latter is determined from the calculated amount of heat transporting material circulating in the furnace. Whether the height level of an end connection is proper or not is judged from density of heat transporting material at a determined location when stirring the heat transporting material in the riser. However, since the density of heat transporting material at the location alters according to the parameters such as grain size or specific gravity of the heat transporting material, or velocity of the gas in the riser, it is impossible to evaluate the height level univocally according to the density of heat transporting material. That is, the pressure or quantity of pressure drop at the present location can be used for the justification of the height level of an end connection.

On the other hand, the judgment of the size of the downcomer is done according to the velocity of the heat transporting material in the downcomer as well as above mentioned calculated amount of the heat transporting material in circulation. Since these values also alter according to the parameters such as grain size or specific gravity of the heat transporting material, the optimization of the operation includes much difficulty.

In the conventional technology, in order to avoid such intricacy, a pooling device is provided at the middle of the downcomer for pooling the heat transporting material therein, to which a means for blowing compressed gas into the pooling device for sending the heat transporting material into the riser. By this method, it is necessary to put gas energy at an exalted state since the gas is blown into the furnace to raise the velocity of the heat transporting material which at first is zero or very small. It is also necessary by this method to distend the size of the downcomer since the total volume of flow increases due to the gas blow.

As described above, in the conventional method of making the fluid bed type furnace, there are some difficulties as follows. In determining the height of the connecting end from the total amount of the heat transporting material, or in determining the size of the downcomer from the calculated amount of heat transporting material in circulation, it is difficult to obtain correct values since these values cannot be determined univacally as described above. Thus, in the furnace designed after the conventional process, many problems will occur relating to the downcomer, such as blocking of the heat transporting material when the size of the downcomer is small, or decrease of the heat transporting material in circulation due to the generation of gas flow in a direction from the lower part of the riser to a cyclone separator by way of the downcomer (called as a "reverse gas flow" hereafter) when the size of the downcomer is large.

Otherwise, in the method of equipping a pooling device at the middle of the downcomer, not only is the size of the downcomer necessarily large due to increase of volume of flow occurring from the gas blow, but also a large energy is necessary for returning the heat transporting material by bringing them at high speed from stationary state or a state of very low speed.

SUMMARY OF THE INVENTION

The present invention was made in view of the above background, and is aimed at presenting a method for making a fluid bed type furnace having an external circulation system, in which generation of blocking of the heat transporting material or reverse gas flow can be prevented by properly selecting the size of the downcomer or so in accordance with required amount of heat transporting material in circulation or characteristics of material charged to the furnace.

The present invention is to accomplish the objectives mentioned above, and thus presents a method for making a fluid bed type furnace comprising a riser for containing a mixture of primary air and solid heat transport medium, a cyclone for separating said solid heat transport medium from gas, and a down comer disposed outside of the riser for returning said solid heat transport medium from said cyclone to said riser, the method comprising the step of determining the diameter of the down comer and the diameter of the riser so that the ratio (X) thereof falls in an area between two lines described as follows, in a Ws–X plane:

$$Ws = 12500X^5 - 12080X^4 + 4370X^3 - 600X^2 + 36X$$

and $$W_s = 5800X^4 + 1600X^3 - 580X^2 + 44X$$

wherein, Ws is flow rate of solid heat transport medium in the riser at each unit area the cross section (kg/m² sec); X is a ratio of the diameter of down comer (d) to the diameter of riser (D).

According to another aspect of the present invention there is also provided a method for making an external circulation fluid bed furnace according to, wherein the fluid bed furnace further comprises a supplemental air supply means for blowing hot air in one of said cyclone and said down comer, the method-further comprising the step of determining the diameter of the down comer so that ratio (r) of the diameter of down comer (da) and the diameter of down comer without supplemental air supply means (dO) falls in an area between first and second lines described as follows, in a r-F plane:

First line being defined as:

| | |
|---|---|
| r = −2.8F + 1 | for 0 ≦ F < 0.1 |
| r = −0.7F + 0.79 | for 0.1 ≦ F |

Second line being defined as:

| | |
|---|---|
| r = −3F + 0.877 | 0 ≦ F < 0.02 |
| r = −0.27F + 0.871 | 0.02 ≦ F < 0.1 |
| r = −33F + 0.663 | 0.1 ≦ F | wherein r=da/d0; F=Fa/Ft; Fa is the volume of supplemental air, and Ft is the volume of total air.

Another aspect of the present invention provides a method for making an external circulation fluid bed furnace according to, wherein said down comer has an aperture opening to a lower part of said riser for returning said solid heat transporting medium, and the method comprises a step of determining the height (H) of said aperture measured from a standard level, and a ratio (L) of said height (H) to a radius (D/2) of said down comer so that the height (H) and ratio fall within the area between first and second lines as defined as follows in a y-L plane:

First line:

| | |
|---|---|
| y = −0.5L + 0.75 | for −1.3 ≦ L < −0.715 |
| y = −0.15L + 1.0 | for −0.715 ≦ L < 0 |
| y = −0.3L + 1.0 | for 0 ≦ L < 0.5 |
| y = −0.05L + 0.875 | for 0.5 ≦ L < 1.5 |

Second line:

| | |
|---|---|
| y = −0.4L + 1.0 | for −1.3 ≦ L < 0 |
| y = −0.05L + 1.0 | for 0 ≦ L ≦ 1.5 | wherein L=H/D/2=2H/D

Still further aspect of the invention provides a method for making an external circulation fluid bed furnace according to, wherein at least one of fuel and combustible material supplied to said furnace contains alkali element, and the method comprises a step for determining the diameter of the down comer so that the diameter falls within the area between first line and second line defined as follows in an A-X plane:

First line:
$$A = 714X^3 - 2256X^2 + 2424X - 882$$

Second line:
$$A = 169.7X^2 - 346.8X + 1777.1$$

wherein X is a deviation of the diameter of down comer from that of standard diameter.

DESCRIPTION OF THE PREFERRED EMBODIMENTS

Embodiments of the present invention will be described with reference to FIGS. 1 through 6 and Table 1 through 4 in the following sections.

Figure 1:
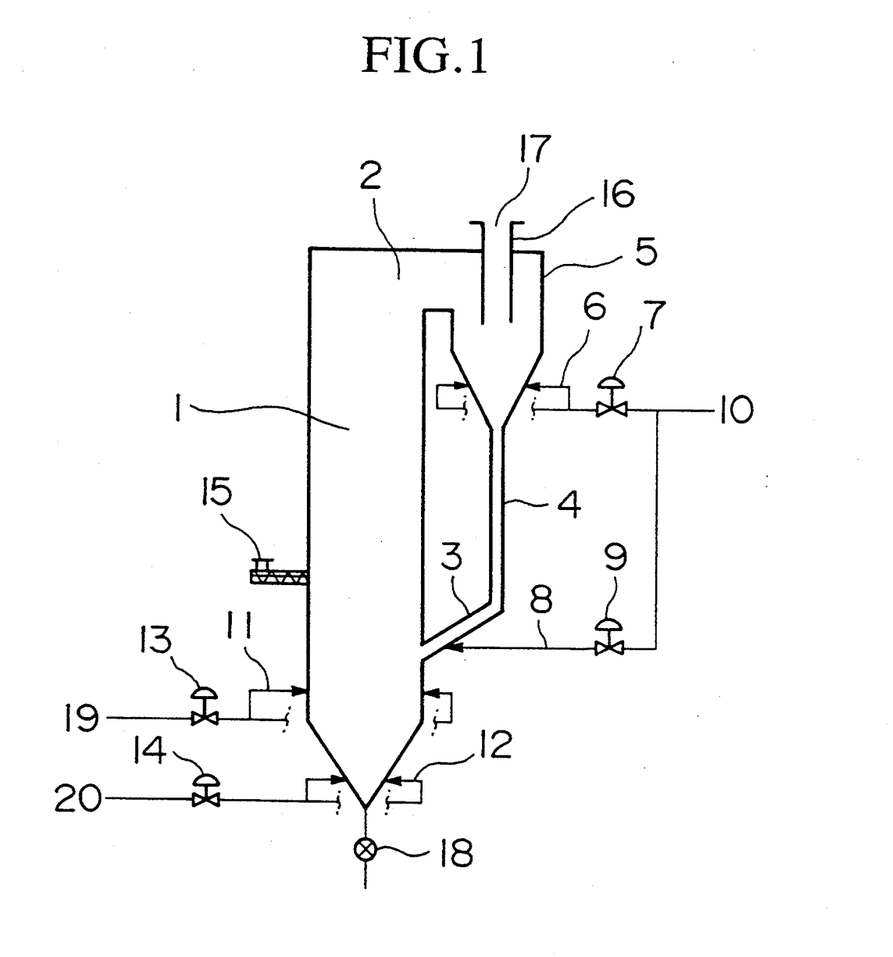
FIG. 1 is a schematic drawing showing an embodiment of the present invention.
Figure 2:
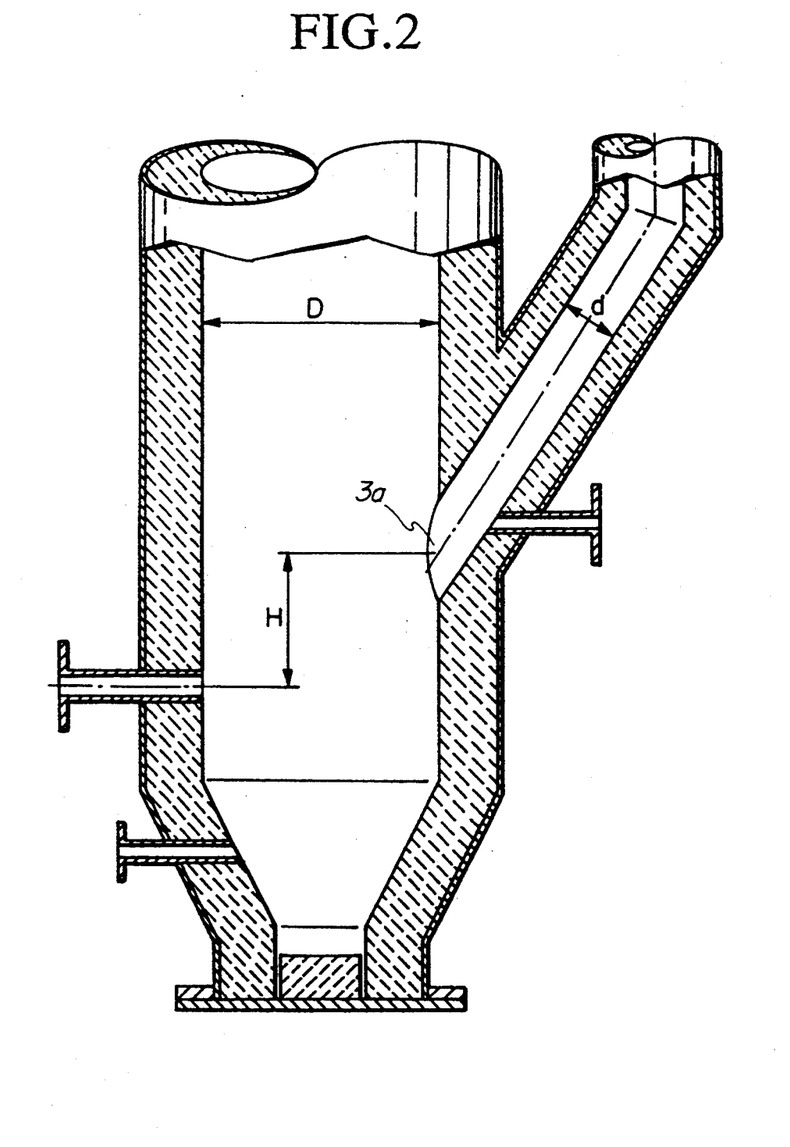
FIG. 2 is a cross-sectional drawing of the riser.

FIGS. 1 and 2 show an embodiment wherein the furnace according to the present invention is utilized to burn industrial liquid wastes and sludges.

As shown in FIGS. 1 and 2, the furnace is provided with a riser 1, a cyclone 5, an outlet conduit 2 communicating the riser to the cyclone, a down comer 4 provided underneath the cyclone. The riser 1 defines a cylindrical internal space for combustion reaction and having an inner lining made of a heat resistant material. The riser is provided with first and second primary air inlet conduits 11, 12 at a lower part thereof and at different heights. The down comer 4 has a vertical upper portion and an inclined lower portion which is connected to the lower portion of the internal space of the riser through an aperture 3a. The aperture 3a is located at a higher location compared to the secondary air inlet conduit 11 and their vertical distance is denoted by H.

Two supplementary air inlet nozzles 6, 8 are provided to cyclone 5 and outlet conduit 2 at locations closer to riser 1 and supply supplemental air to cyclone 5 and outlet conduit 2 through flow control valves 7, 9. First and second primary air inlet conduits 11, 12 supply primary and secondary air to the riser through flow control valves 13, 14.

Riser 1 is provided with a combustible material inlet port 15 and an outlet valve 18 at a middle portion and a bottom portion thereof, respectively. Cyclone 5 is provided with an outlet line 16 and an outlet port 16.

Heat transporting medium is provided in the riser when the furnace is operated and air is blown from the air inlet conduits 11, 12 for combustion and fluidization of the heat transporting medium. The combustible medium is supplied to the furnace through combustible medium inlet port 15. The total amount of the air supplied to the riser, which is a sum of the air supplied through primary air inlet conduits 11, 12 and secondary air inlet conduits 6, 8, is determined so that the oxygen enough to react all the combustible material is burned. When the air is not supplied through secondary air conduits 6, 8, the flow rate of the lower primary air inlet 12 remains constant while that of the upper primary air inlet 11 varies. The total air flow rate approximately determines the rate of flow of the heat transporting medium in the riser per unit time and per unit cross sectional area.

The heat transporting medium, which is a form of small particles, is first mixed with the primary air supplied from the primary air inlet conduits, blown in a form of a gas-solid particle mixture. The combustible material is also mixed with the air and the heat transporting material, and receives heat from therefrom consequently losing humidity contained in it. The combustible material is crushed into small pieces by the numerous collisions with the heat transporting material. The combustible material crushed into small pieces are blown upward with the heat transport medium by the circulating air as burning.

The combustible material blow upward with the heat transporting medium is accelerated by the secondary air blow through secondary air inlet conduit 11 and continues burning. The combustible material completes burning approximately when it reaches the top portion of the riser, and the leavings of the combustion, that is mainly ash, is lead to cyclone 5 through outlet conduit 2 with the heat transporting medium.

The heat transporting medium lead to the cyclone is separated from the gas mixture by the centrifugal force in the cyclone, and exited from a lower part of the cyclone to enter the down comer. The air and the combustion leavings separated from the heat transporting medium is lead to outlet conduit 16 so as to be laid outside the system described above.

In the case wherein either the combustible material or the fuel for combustion contains a compound containing potassium or sodium, a salt of these elements are formed while the combustible material is burned in the riser. Most portion of the salt formed as described above is in a form of small particles or formed on the surface of the heat transporting material. However, some portion of the salt further reacts with the heat transporting medium to produce reaction products. Such reaction products have lower melting temperatures, and tend to melt and stick to the internal surface of the system, such as inside the down comer and obstacles a smooth flow of the medium in the system. The flow condition in the system is affected seriously when such reaction products stick to the inner surface and hinders the flow depending on the dimensions of down comer 4 and inlet conduits 3.

It has been found by experiments that is supplemental air is provided by supply air conduits 6, 8 provided with flow control valve 7, 9, the hindrance due to the sticking reaction products is substantially reduced especially for small down comer sizes. When the diameter of the down comer is relatively small, the effective diameter of the down comer tends to be reduced due to the sticking reaction products. The flow rate in the down comer is consequently reduced and the separation ability of the cyclone is degraded, and the amount of the heat transport medium effective operating in the system is reduced. The operation of the system thus becomes unstable and difficult.

When the diameter of down comer 4 is larger than an appropriate size, an upward air flow occurs in the down comer from the aperture of the down comer opening to the lower part of riser 1 toward cyclone 5. Due to the upward air flow, a portion of the heat transporting medium is blown upward and exited to the outside of the system through cyclone 5 and outlet conduit 16. This upward flow can also be reduced or stopped by providing a downward stream by supplementary air through supplementary air conduits 6, 8.

A number of cold experiments have been performed without heating the medium in order to evaluate the effects of the parameters except for the effects of alkali salts. Hot experiments with heating the mediums have also been performed in order to evaluate the effects of the alkali elements contained in the combustible materials. The results of the experiments are described as follows in Tables 1 through 4.

In the experiments, diameters of the riser was selected from 0.3 m and 0.32 m, diameters of the down comer was selected from various values between 0.033 m and 0.1 m, total air supply was varied between 480 and 1720 $Nm^3/h$, and supplementary air which was included in the total air supply was varied between 0 and 350 $Nm^3/h$. Height of inlet conduit 3 measured from the center of secondary air inlet conduit 11 to the center of the inlet conduit 3 was varied from 0.15 to 0.525 m.

The operation of the furnace is evaluated according to the existence of congestion in down comer 4 or inlet conduit 3.

Effects of the variables on the congestion obtained from the experiments are described in FIGS. 3 to 6.

Figure 3:
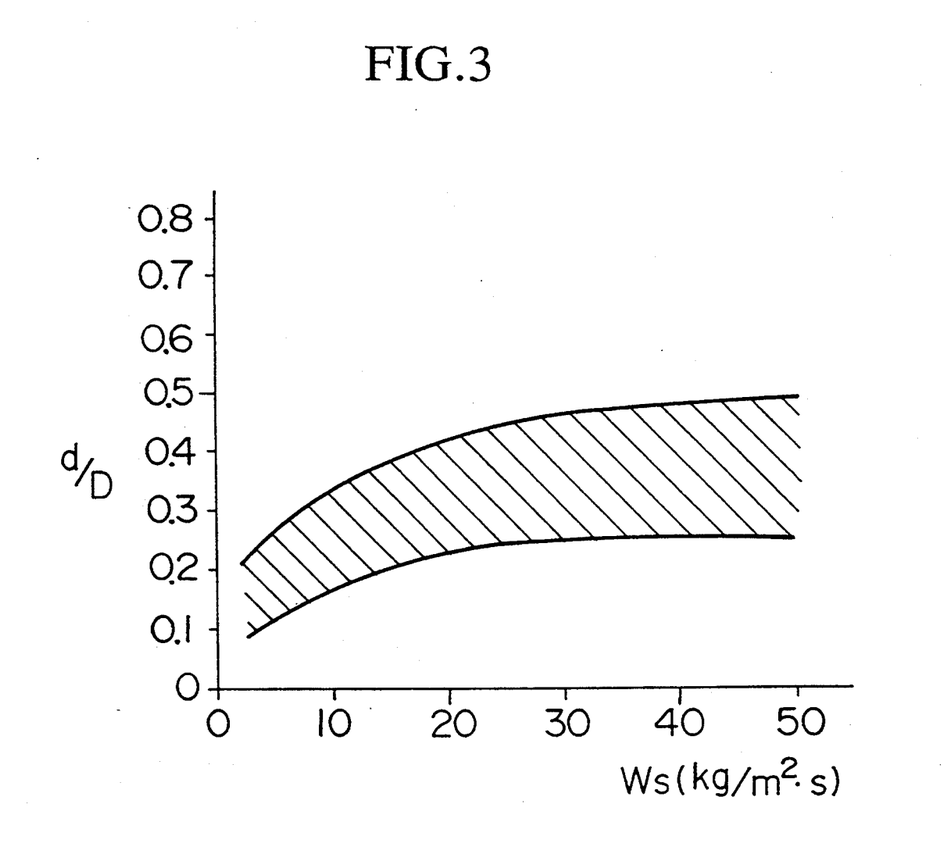
FIG. 3 is a graph showing relationship between a ratio x of diameter d of the downcomer to the diameter D of the riser and the amount of solid particles in circulation Ws.

Table 1 shows the effects of the diameter d of down comer and diameter D of the riser on the upward stream in the down comer. The flow was measured in terms of the amount of solid particles flowing upwards in the down comer. In the comparison, diameter D of the riser and the height H of inlet conduit 3 measured from secondary air inlet conduit 11 are maintained unchanged, and total air circulation Ws and diameter d of down comer 4 were varied without supplying supplemental air. FIG. 3 shows the conditions wherein no congestion occurred in the down comer. FIG. 3 shows that by properly choosing the variable, it is possible to create a regular circulation of the air and heat transporting medium, that is, unidirectional flow without reversal flow in the down comer. The conditions is that the ratio of the diameter d of the down comer to the diameter D of the riser (X) falls in an area between two lines described as follows, in a Ws-X plane:

$$Ws = 12500X^5 - 12080X^4 + 4370X^3 - 600X^2 + 36X$$

and $$Ws = 5800X^4 + 1600X^3 - 580X^2 + 44X$$

wherein, Ws is flow rate of solid heat transport medium in the riser at each unit area the cross section ($kg/m^2$ sec). The parameter Ws was between 0 and 50.

When X is larger than the above area, an upward stream occurs in the down comer. When X is smaller than the above area, a congestion occurs in the down comer.

It becomes possible to determine the diameter of the

TABLE 1

| diameter of riser (D)m | diameter of downcomer (d)m | total air volume (Ft) Nm³/h | supplemental air volume (Fa) Nm³/h | weight of circulating media (Ws) kg/m²·s | height of downcomer aperture (H) | blown amount (Wc) | congestion | X = d/D | F = Fa/Ft | L = 2H/D | y = d/do | r = da/do | x = d/do |
|---|---|---|---|---|---|---|---|---|---|---|---|---|---|
| 0.3 | 0.04 | 1200 | 0 | 4.5 | 0.3 | 1.3 | X | 0.133 | 0 | 2 | — | — | — |
| 0.3 | 0.04 | 1300 | 0 | 5.2 | 0.3 | 1.5 | X | 0.133 | 0 | 2 | — | — | — |
| 0.3 | 0.04 | 1350 | 0 | 5.4 | 0.3 | — | ○ | 0.133 | 0 | 2 | — | — | — |
| 0.3 | 0.05 | 1700 | 0 | 19.1 | 0.3 | — | ○ | 0.167 | 0 | 2 | — | — | — |
| 0.3 | 0.06 | 1750 | 0 | 20.0 | 0.3 | — | ○ | 0.2 | 0 | 2 | — | — | — |
| 0.3 | 0.06 | 1700 | 0 | 19.2 | 0.3 | 1.6 | X | 0.2 | 0 | 2 | — | — | — |
| 0.3 | 0.07 | 1000 | 0 | 3.2 | 0.3 | 6.3 | X | 0.233 | 0 | 2 | — | — | — |
| 0.3 | 0.07 | 1100 | 0 | 3.5 | 0.3 | 1.2 | X | 0.233 | 0 | 2 | — | — | — |
| 0.3 | 0.07 | 1200 | 0 | 36 | 0.3 | 1.7 | X | 0.233 | 0 | 2 | — | — | — |
| 0.3 | 0.07 | 2200 | 0 | 38 | 0.3 | — | ○ | 0.233 | 0 | 2 | — | — | — |
| 0.3 | 0.1 | 1500 | 0 | 9.4 | 0.3 | 8.9 | X | 0.333 | 0 | 2 | — | — | — |
| 0.3 | 0.1 | 1560 | 0 | 9.9 | 0.3 | 1.1 | X | 0.333 | 0 | 2 | — | — | — |
| 0.3 | 0.1 | 1700 | 0 | 19.8 | 0.3 | 1.6 | X | 0.333 | 0 | 2 | — | — | — |
| 0.3 | 0.1 | 2200 | 0 | 49.0 | 0.3 | 1.7 | X | 0.333 | 0 | 2 | — | — | — |
| 0.3 | 0.125 | 1750 | 0 | 18.8 | 0.3 | 5.7 | X | 0.417 | 0 | 2 | — | — | — |
| 0.3 | 0.125 | 1850 | 0 | 20.6 | 0.3 | 1.8 | X | 0.417 | 0 | 2 | — | — | — |
| 0.3 | 0.125 | 1950 | 0 | 26 | 0.3 | 1.5 | X | 0.417 | 0 | 2 | — | — | — |
| 0.3 | 0.125 | 2200 | 0 | 46 | 0.3 | 1.9 | X | 0.417 | 0 | 2 | — | — | — |
| 0.3 | 0.14 | 2000 | 0 | 35 | 0.3 | 4.9 | X | 0.467 | 0 | 2 | — | — | — |
| 0.3 | 0.14 | 2100 | 0 | 41 | 0.3 | 1.0 | X | 0.467 | 0 | 2 | — | — | — |
| 0.3 | 0.14 | 2300 | 0 | 50 | 0.3 | 1.3 | X | 0.467 | 0 | 2 | — | — | — |
| 0.3 | 0.15 | 2000 | 0 | 41.5 | 0.3 | 8.9 | X | 0.5 | 0 | 2 | — | — | — |
| 0.3 | 0.15 | 2300 | 0 | 50 | 0.3 | 7.0 | X | 0.5 | 0 | 2 | — | — | — | down comer according to the conditions described in FIG. 3 as follows. First, the total amount of air circulation is determined for burning total amount of combustible material in the furnace. Then the rate of circulation of the heat transporting medium is determined. Then, according to FIG. 3, a variable X is determined, and the diameter d of the down comer is determined by using the diameter D of the riser and variable X.

Figure 4:
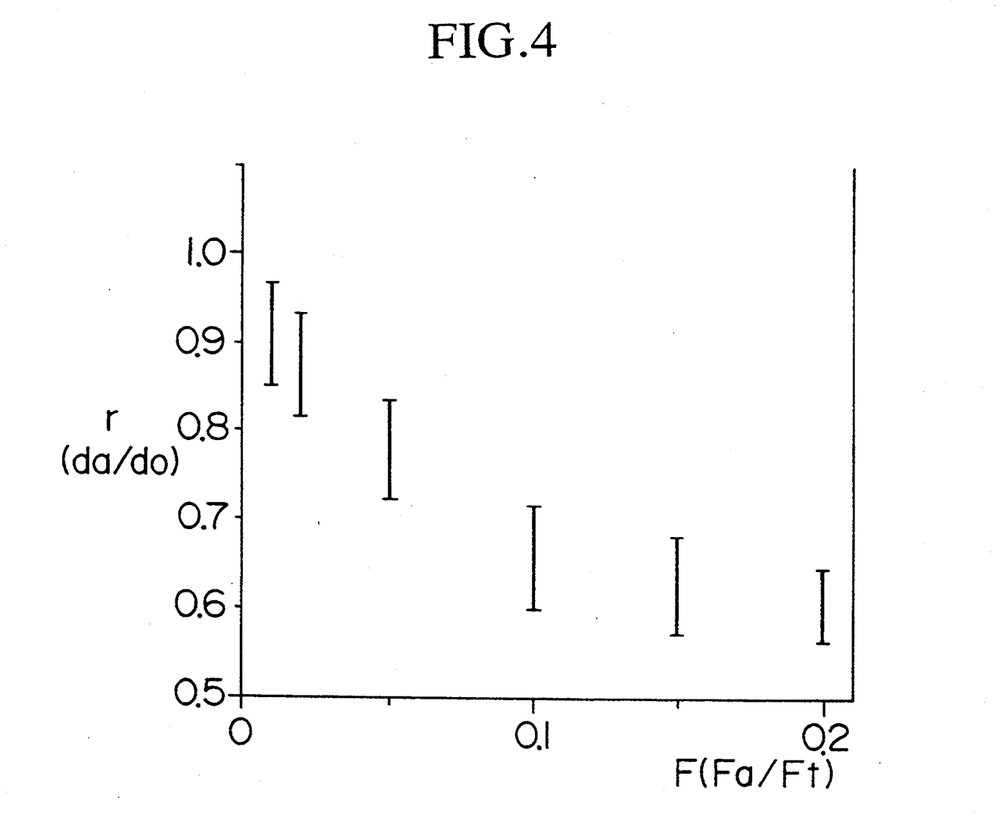
FIG. 4 is a graph showing relationship between a ratio r of diameter da of the downcomer when subsidiary air is supplied, to diameter do of the downcomer when no subsidiary air is supplied, and a ratio F of the amount of the subsidiary air to the total amount of supplied air.

Table 2 shows the data obtained from experiments wherein the diameter d of the down comer was varied around 0.06 m while maintaining the diameter D of the riser and total air circulation Ws constant. Supplemental air flow was supplied through supplemental air conduits 6, 8, and the proportion F of the supplemental air Fa to the total air flow Ft was varied. FIG. 4 shows the effects of the diameter of the down comer in terms of the deviation from its mean value, that is, 0.06 m.

The condition wherein no congestion occurs is when the ratio r of the diameter da of down comer and the diameter of down comer dO without supplemental air supply means falls in an area between first and second lines described as follows, in a r-F plane:

First line being defined as:

| | |
|---|---|
| r = −2.8F + 1 | for 0 ≦ F < 0.1 |
| r = −0.7F + 0.79 | for 0.1 ≦ F |

Second line being defined as:

| | |
|---|---|
| r = −3F + 0.877 | 0 ≦ F < 0.02 |

TABLE 2

| diameter of riser (D)m | diameter of downcomer (d)m | total air volume (Ft) Nm³/h | supplemental air volume (Fa) Nm³/h | weight of circulating media (Ws) kg/m²·s | height of downcomer aperture (H) | blown amount (Wc) | congestion | X = d/D | F = Fa/Ft | L = 2H/D | y = d/do | r = da/do | x = d/do |
|---|---|---|---|---|---|---|---|---|---|---|---|---|---|
| 0.3 | 0.06 | 1700 | 0 | 19.2 | 0.3 | 1.6 | X | 0.2 | 0 | 2 | — | — | — |
| 0.3 | 0.058 | 1700 | 20 | 19.1 | 0.3 | 5.4 | X | 0.193 | 0.012 | 2 | — | 0.967 | — |
| 0.3 | 0.057 | 1700 | 20 | 19.4 | 0.3 | 1.2 | X | 0.190 | 0.012 | 2 | — | 0.95 | — |
| 0.3 | 0.052 | 1700 | 20 | 19.2 | 0.3 | 1.4 | X | 0.173 | 0.012 | 2 | — | 0.867 | — |
| 0.3 | 0.050 | 1700 | 20 | 19.5 | 0.3 | — | ○ | 0.167 | 0.012 | 2 | — | 0.833 | — |
| 0.3 | 0.050 | 1705 | 35 | 19.4 | 0.3 | 1.6 | X | 0.167 | 0.021 | 2 | — | 0.833 | — |
| 0.3 | 0.048 | 1705 | 35 | 19.6 | 0.3 | — | ○ | 0.160 | 0.021 | 2 | — | 0.800 | — |
| 0.3 | 0.051 | 1700 | 80 | 19.2 | 0.3 | 6.3 | X | 0.170 | 0.047 | 2 | — | 0.850 | — |
| 0.3 | 0.050 | 1700 | 80 | 19.0 | 0.3 | 1.1 | X | 0.167 | 0.047 | 2 | — | 0.833 | — |
| 0.3 | 0.042 | 1700 | 150 | 18.7 | 0.3 | 1.4 | X | 0.140 | 0.088 | 2 | — | 0.700 | — |
| 0.3 | 0.044 | 1720 | 170 | 19.8 | 0.3 | 5.1 | X | 0.147 | 0.099 | 2 | — | 0.733 | — |
| 0.3 | 0.043 | 1720 | 170 | 18.7 | 0.3 | 1.3 | X | 0.143 | 0.102 | 2 | — | 0.717 | — |
| 0.3 | 0.036 | 1675 | 175 | 18.9 | 0.3 | 1.5 | X | 0.120 | 0.104 | 2 | — | 0.600 | — |
| 0.3 | 0.035 | 1675 | 175 | 19.4 | 0.3 | — | ○ | 0.117 | 0.104 | 2 | — | 0.583 | — |
| 0.3 | 0.042 | 1700 | 250 | 19.4 | 0.3 | 8.1 | X | 0.14 | 0.147 | — | — | 0.700 | — |
| 0.3 | 0.041 | 1700 | 250 | 20.1 | 0.3 | 1.9 | X | 0.137 | 0.147 | — | — | 0.683 | — |
| 0.3 | 0.038 | 1750 | 250 | 19.9 | 0.3 | 1.2 | X | 0.127 | 0.143 | — | — | 0.633 | — |
| 0.3 | 0.035 | 1700 | 250 | 19.1 | 0.3 | 1.1 | X | 0.117 | 0.147 | — | — | 0.583 | — |

TABLE 2-continued

| diameter of riser (D)m | diameter of downcomer (d)m | total air volume (Ft) Nm³/h | supplemental air volume (Fa) Nm³/h | weight of circulating media (Ws) kg/m²·s | height of downcomer aperture (H) | blown amount (Wc) | congestion | X = d/D | F = Fa/Ft | L = 2H/D | y = d/do | r = da/do | x = d/do |
|---|---|---|---|---|---|---|---|---|---|---|---|---|---|
| 0.3 | 0.034 | 1700 | 250 | 18.8 | 0.3 | — | ○ | 0.113 | 0.147 | — | — | 0.567 | — |
| 0.3 | 0.040 | 1700 | 350 | 19.3 | 0.3 | 6.0 | X | 0.133 | 0.206 | — | — | 0.667 | — |
| 0.3 | 0.039 | 1700 | 350 | 18.9 | 0.3 | 1.3 | X | 0.130 | 0.206 | — | — | 0.65 | — |
| 0.3 | 0.034 | 1700 | 350 | 19.2 | 0.3 | 1.7 | X | 0.113 | 0.206 | — | — | 0.567 | — |
| 0.3 | 0.033 | 1700 | 350 | 18.6 | 0.3 | — | ○ | 0.110 | 0.206 | — | — | 0.550 | — |

| | |
|---|---|
| r = −0.27F + 0.871 | 0.02 ≦ F < 0.1 |
| r = −33F + 0.663 | 0.1 ≦ F | wherein r=da/d0; F=Fa/Ft; Fa is the volume of supplemental air, and Ft is the volume of total air.

The figure tells that when the supplemental air supply is high, the diameter of the down comer can be small. FIG. 4 provides information how the diameter of the down comer must be modified by taking into account the supplemental air flow.

Figure 5:
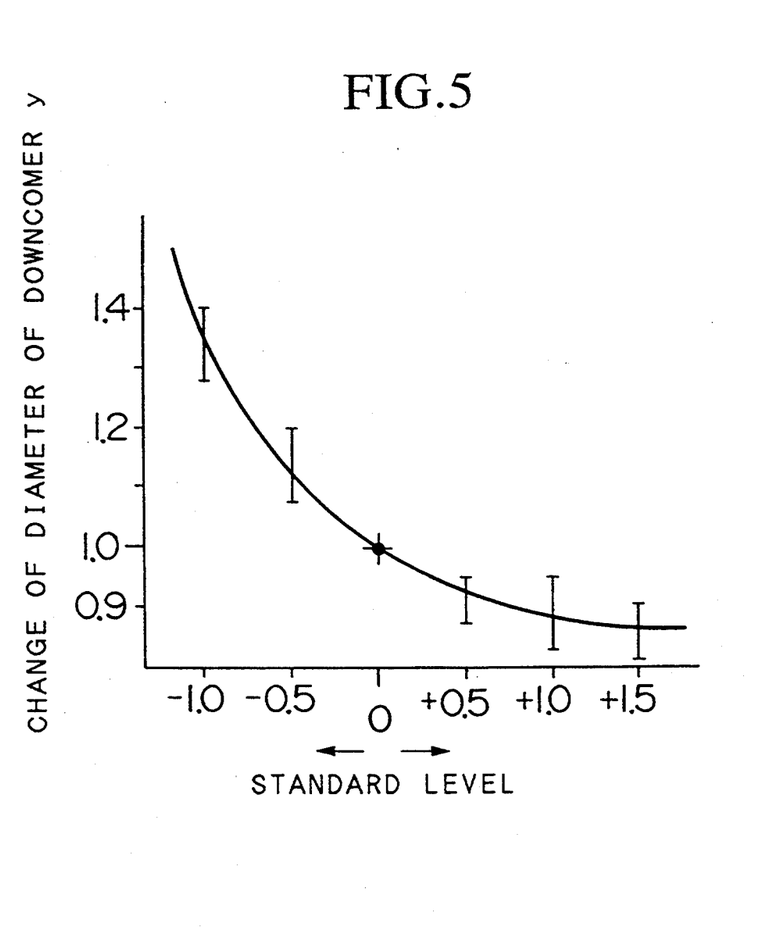
FIG. 5 is a graph showing relationship between ratio of height of the end connection of the downcomer from a standard level to radius of riser and deviation y of diameter of the downcomer.

Table 3 shows the effects of the height 3a of the aperture through which the down comer is connected to the riser. The parameters H and d as described above were varied in order to obtain this information.

FIG. 5 shows the relationship between the diameter of the down comer and the height of the aperture 3a. According to FIG. 5, it is understood that the down comer must have a large diameter so that the heat transporting medium is returned to the lower part of the riser where the air-solid mixture has a relatively high density. The relationship is when the ratio (L) of said height (H) to a radius (D/2) of said down comer falls within the area between first and second lines as defined as follows in a y-L plane (wherein L=H/D/2=2H/D):

First line:

| | |
|---|---|
| y = −0.5L + 0.75 | for −1.3 ≦ L < −0.715 |
| y = −0.15L + 1.0 | for −0.715 ≦ L < 0 |
| y = −0.3L + 1.0 | for 0 ≦ L < 0.5 |
| y = −0.05L + 0.875 | for 0.5 ≦ L ≦ 1.5 |

TABLE 3

| diameter of riser (D)m | diameter of downcomer (d)m | total air volume (Ft) Nm³/h | supplemental air volume (Fa) Nm³/h | weight of circulating media (Ws) kg/m²·s | height of downcomer aperture (H) | blown amount (Wc) | congestion | X = d/D | F = Fa/Ft | L = 2H/D | y = d/do | r = da/do | x = d/do |
|---|---|---|---|---|---|---|---|---|---|---|---|---|---|
| 0.3 | 0.085 | 1700 | 0 | 17.9 | 0.15 | 9.3 | X | 0.283 | 0 | 1.0 | 1.417 | — | — |
| 0.3 | 0.083 | 1700 | 0 | 18.6 | 0.15 | 1.9 | X | 0.280 | 0 | 1.0 | 1.400 | — | — |
| 0.3 | 0.077 | 1700 | 0 | 18.8 | 0.15 | 1.7 | X | 0.257 | 0 | 1.0 | 1.283 | — | — |
| 0.3 | 0.075 | 1700 | 0 | 18.1 | 0.15 | — | ○ | 0.250 | 0 | 1.0 | 1.250 | — | — |
| 0.3 | 0.073 | 1700 | 0 | 18.9 | 0.225 | 7.8 | X | 0.243 | 0 | 1.5 | 1.217 | — | — |
| 0.3 | 0.072 | 1700 | 0 | 19.3 | 0.225 | 2.1 | X | 0.240 | 0 | 1.5 | 1.200 | — | — |
| 0.3 | 0.064 | 1700 | 0 | 19.6 | 0.225 | 1.8 | X | 0.213 | 0 | 1.5 | 1.067 | — | — |
| 0.3 | 0.063 | 1700 | 0 | 19.1 | 0.225 | — | ○ | 0.210 | 0 | 1.5 | 1.050 | — | — |
| 0.3 | 0.060 | 1700 | 0 | 19.2 | 0.3 | 1.6 | X | 0.2 | 0 | 2.0 | 1.000 | — | — |
| 0.3 | 0.058 | 1700 | 0 | 19.6 | 0.375 | 12.6 | X | 0.193 | 0 | 2.5 | 0.967 | — | — |
| 0.3 | 0.057 | 1700 | 0 | 20.5 | 0.375 | 2.3 | X | 0.190 | 0 | 2.5 | 0.950 | — | — |
| 0.3 | 0.053 | 1700 | 0 | 20.0 | 0.375 | 1.5 | X | 0.177 | 0 | 2.5 | 0.883 | — | — |
| 0.3 | 0.051 | 1700 | 0 | 20.3 | 0.375 | — | ○ | 0.170 | 0 | 2.5 | 0.850 | — | — |
| 0.3 | 0.058 | 1700 | 0 | 19.1 | 0.45 | 7.3 | X | 0.193 | 0 | 3.0 | 0.967 | — | — |
| 0.3 | 0.057 | 1700 | 0 | 18.6 | 0.45 | 1.8 | X | 0.190 | 0 | 3.0 | 0.950 | — | — |
| 0.3 | 0.053 | 1700 | 0 | 19.4 | 0.45 | 1.4 | X | 0.177 | 0 | 3.0 | 0.883 | — | — |
| 0.3 | 0.051 | 1700 | 0 | 17.9 | 0.45 | — | ○ | 0.170 | 0 | 3.0 | 0.850 | — | — |
| 0.3 | 0.056 | 1700 | 0 | 18.6 | 0.525 | 9.2 | X | 0.187 | 0 | 3.5 | 0.933 | — | — |
| 0.3 | 0.054 | 1700 | 0 | 19.5 | 0.525 | 1.3 | X | 0.180 | 0 | 3.5 | 0.900 | — | — |
| 0.3 | 0.050 | 1700 | 0 | 18.1 | 0.525 | 1.6 | X | 0.167 | 0 | 3.5 | 0.833 | — | — |
| 0.3 | 0.048 | 1700 | 0 | 18.6 | 0.525 | — | ○ | 0.160 | 0 | 3.5 | 0.800 | — | — |

| | |
|---|---|
| y = −0.4L + 1.0 | for −1.3 ≦ L < 0 |
| y = −0.05L + 1.0 | for 0 ≦ L ≦ 1.5 |

The Figure provides a method for adjusting the diameter of the down comer for the deviations of H from its standard value that is 0.3 m.

Figure 6:
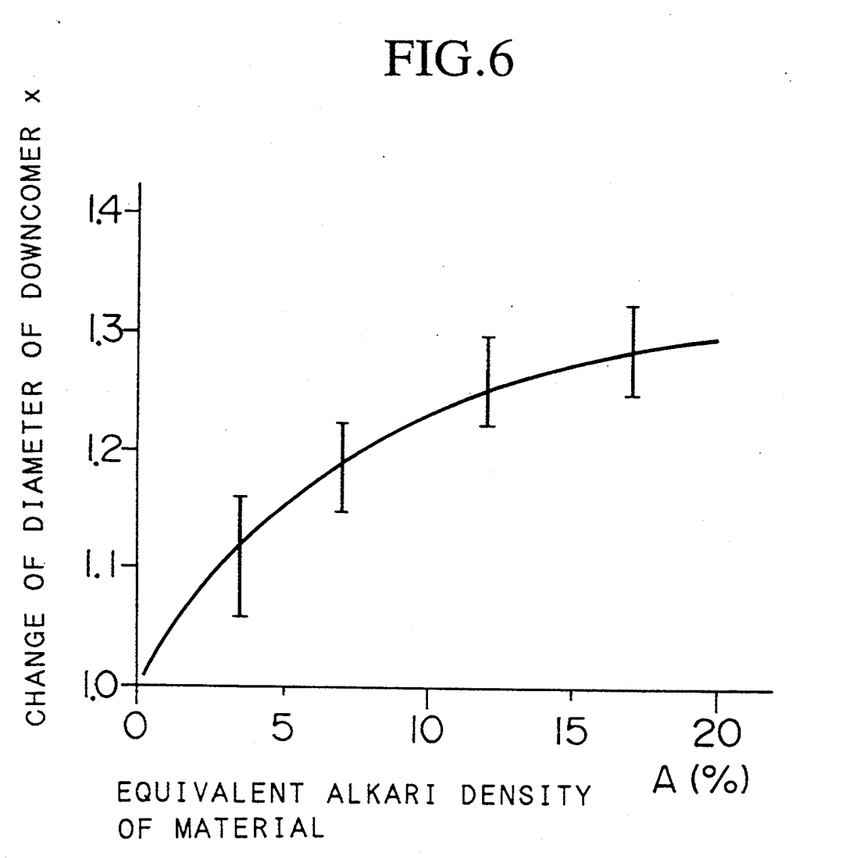
FIG. 6 is a graph showing relationship between deviation x of the diameter of the downcomer from its standard value and density A of alkari salt produced through reaction.

Table 4 shows the results of the experiments which was performed at 800° C. for a combustible material containing alkali elements.

FIG. 6 shows the relationship between the concentration of alkali salts in the combustible material and the diameter of the down comer. The optimal conditions are when the diameter falls within the area between first line and second line defined as follows in an A-X plane:

First line:

$$A = 714X^3 - 2256X^2 + 2424X - 882$$

Second line:

$$A = 169.7X^2 - 346.8X + 177.1$$

wherein X is a deviation of the diameter of down comer from that of standard diameter. Parameter A is between 0 and 20. The parameter A is the weight ratio of $Na_2CO_3$ and $K_2CO_3$ derived from Na and K contained in the combustible material to the total dry weight of the combustible material. The relationship is described as follows:

A = {(total weight of $Na_2CO_3$ derived from Na content

TABLE 4

| diameter of riser (D)m | diameter of downcomer (d)m | total air volume (Ft) Nm³/h | supplemental air volume (Fa) Nm³/h | weight of circulating media (Ws) kg/m²·s | height of downcomer aperture (H) | density of alkari salt in material (A) | blown amount (Wc) | congestion | X = d/D | F = Fa/Ft | L = 2H/D | y = d/do | r = da/do | x = d/do |
|---|---|---|---|---|---|---|---|---|---|---|---|---|---|---|
| 0.32 | 0.062 | 480 | 0 | 5.5 | 0.3 | 0 | 1.4 | X | 0.194 | 0 | 2.0 | — | — | 1.000 |
| 0.32 | 0.062 | 480 | 0 | 5.2 | 0.3 | 3.6 | — | O | 0.194 | 0 | 2.0 | — | — | 1.000 |
| 0.32 | 0.065 | 480 | 0 | 5.6 | 0.3 | 3.6 | — | O | 0.203 | 0 | 2.0 | — | — | 1.048 |
| 0.32 | 0.067 | 480 | 0 | 5.1 | 0.3 | 3.6 | 1.7 | X | 0.209 | 0 | 2.0 | — | — | 1.081 |
| 0.32 | 0.072 | 480 | 0 | 5.5 | 0.3 | 3.6 | 1.4 | X | 0.225 | 0 | 2.0 | — | — | 1.161 |
| 0.32 | 0.074 | 480 | 0 | 5.6 | 0.3 | 3.6 | 7.1 | X | 0.231 | 0 | 2.0 | — | — | 1.194 |
| 0.32 | 0.070 | 480 | 0 | 5.4 | 0.3 | 7.0 | — | O | 0.219 | 0 | 2.0 | — | — | 1.129 |
| 0.32 | 0.074 | 480 | 0 | 5.3 | 0.3 | 7.0 | 1.1 | X | 0.231 | 0 | 2.0 | — | — | 1.194 |
| 0.32 | 0.076 | 480 | 0 | 5.1 | 0.3 | 7.0 | 1.4 | X | 0.238 | 0 | 2.0 | — | — | 1.226 |
| 0.32 | 0.078 | 480 | 0 | 4.8 | 0.3 | 7.0 | 7.9 | X | 0.244 | 0 | 2.0 | — | — | 1.258 |
| 0.32 | 0.076 | 480 | 0 | 5.2 | 0.3 | 12.0 | — | O | 0.238 | 0 | 2.0 | — | — | 1.226 |
| 0.32 | 0.078 | 480 | 0 | 5.6 | 0.3 | 12.0 | 1.6 | X | 0.244 | 0 | 2.0 | — | — | 1.258 |
| 0.32 | 0.080 | 480 | 0 | 4.6 | 0.3 | 12.0 | 1.2 | X | 0.250 | 0 | 2.0 | — | — | 1.290 |
| 0.32 | 0.082 | 480 | 0 | 6.0 | 0.3 | 12.0 | 9.9 | X | 0.256 | 0 | 2.0 | — | — | 1.323 |
| 0.32 | 0.076 | 480 | 0 | 5.6 | 0.3 | 17.0 | — | O | 0.238 | 0 | 2.0 | — | — | 1.226 |
| 0.32 | 0.078 | 480 | 0 | 4.8 | 0.3 | 17.0 | 1.3 | X | 0.244 | 0 | 2.0 | — | — | 1.258 |
| 0.32 | 0.080 | 480 | 0 | 5.2 | 0.3 | 17.0 | 1.0 | X | 0.250 | 0 | 2.0 | — | — | 1.290 |
| 0.32 | 0.082 | 480 | 0 | 5.6 | 0.3 | 17.0 | 1.7 | X | 0.256 | 0 | 2.0 | — | — | 1.323 |
| 0.32 | 0.083 | 480 | 0 | 5.5 | 0.3 | 17.0 | 14.5 | X | 0.259 | 0 | 2.0 | — | — | 1.339 | supposing that all the Na content in the combustible material reacted to make it) + (total weight of $K_2CO_3$ derived from K content supposing that all the K content in the combustible material reacted to make it)}/(dry weight of the combustible material)

For example, if the combustible material contains 50% by weight of water which contains 2 wt % percent Na and 0.5 wt % of K, the variable A is calculated as follows:

---

A = 0.02 × (molecular weight of $Na_2CO_3$)/2(molecular weight of Na) + 0.005 × (molecular weight of $K_2CO_3$)/2(molecular weight of K) =
0.02 × 2.304 + 0.005 × 1.767 =
0.055

---

The above relationship provides the method determining the diameter of down comer when the concentration A of the alkali salt is provided.

We claim:

1. A heat treatment method using an external circulation fluid bed furnace, comprising the steps of:
   providing an external circulation fluid bed furnace which comprises a cylindrical riser having at least one air inlet conduit and an outlet conduit respectively connected at lower and upper ends thereof, solid heat transport medium filled in said riser, a cyclone having an inlet connected to said outlet conduit of said riser, and a tubular down comer which connects an outlet of said cyclone and a lower part of said riser;
   heating said solid heat transport medium in said riser while supplying air into said riser from said air conduit to form a fluidized bed;
   supplying a material to be heat-treated into said riser, and mixing said material into said fluidized bed;
   circulating said solid heat transport medium through said outlet conduit, said cyclone, said down comer and said riser; and
   wherein the inner diameter d of said down comer is set at a constant value d0 determined by the following formulae:
   d0 = D*X $$Ws \geq 12500X^5 - 12080X^4 + 4370X^3 - 600X^2 + 36X$$
$$Ws \geq 5800X^4 + 1600X^3 - 580X^2 + 44X$$

wherein Ws (kg/m² sec) is a flow rate of said solid heat transport medium in said riser at each unit area of the cross section of said riser in the following range, and X is a ratio d/D of said diameter d of said down comer to an inner diameter D of said riser.

2. A heat treatment method according to claim 1, wherein said fluid bed furnace further comprises a supplemental air supply means for supplying hot air into at least one of said cyclone and said down comer; and
   said step of circulating is performed while supplying supplemental air through said supplemental air supply means, and the diameter d of said down comer is a compensated value da which is determined by the following formulae using said value d0:
   da = d0*r r falls in an area between the following first and second lines in a r-F plane:

first line:

| r = −2.8F + 1 | for 0 ≤ F < 0.1 |
|---|---|
| r = −0.7F + 0.79 | for 0.1 ≤ F | second line:

| r = −3F + 0.877 | for 0 ≤ F < 0.02 |
|---|---|
| r = −0.27F + 0.871 | for 0.02 ≤ F < 0.1 |
| r = −33F + 0.663 | for 0.1 ≤ F | wherein F is a volume ration Fa/Ft of a volume Fa of said supplemental air to a total volume Ft of the total air supplied to said fluid bed furnace, and r is a ratio da/d0.

3. A heat treatment method according to claim 1, wherein said down comer has an aperture opening at a lower part of said riser for returning said solid heat transporting medium, said riser has a first air inlet conduit connected to said lower end of said riser and a second air inlet conduit connected to a lower part of said riser which is located at a higher position than said lower end, said aperture of said down comer is located at a height II measured from said second air inlet conduit; and said step of circulating is performed while supplying air through said first and second air inlet conduits, and the diameter d of said down comer is set at a compensated value db which is determined by the following formulae using said value d0:
db=d0*y
y falls in an area between the following first and second lines in a y-L plane:
first line:

| $y = -0.5L + 0.75$ | for $-1.3 \leq L < -0.715$ |
| $y = -0.15L + 1.0$ | for $-0.715 \leq L < 0$ |
| $y = -0.3L + 1.0$ | for $0 \leq L < 0.5$ |
| $y = -0.05L + 0.875$ | for $0.5 \leq L \leq 1.5$ | second line:

| $y = -0.4L + 1.0$ | for $-1.3 \leq L < 0$ |
| $y = -0.05L + 1.0$ | for $0 \leq L \leq 1.5$ | wherein L is a ration 2 H/D of said height II to a radius D/2 of said riser, and y is a ration db/d0.

4. A heat treatment method according to claim 1, wherein and material to be heated contains at least one of Na and K, and the diameter d of said down comer is set at a compensated value dc which is determined by the following formulae using said value d0:
dc=d0*X
x falls in an area between the following first and second lines in a A-x plane:
first line:
$A = 714x^3 - 2256x^2 + 2424x - 882$
second line:
$A = 169.7x^2 - 346.8x + 177.1$
wherein A is a weight ratio of $Na_2CO_3$ and $K_2CO_3$ derived from Na and K contained in said material to the total dry weight of said material, and x is a ration dc/d0.

5. A heat treatment method according to claim 1, wherein said material is combusted in said step of circulating.

6. A heat treatment method according to claim 2 wherein said down comer has an aperture opening at a lower part of said riser for returning said solid heat transporting medium, said riser has a first air inlet conduit connected to said lower end of said riser and a second air inlet conduit connected to a lower part of said riser which is located at a higher position than said lower end, and said aperture of said down comer is located at a height II measure from said second air inlet conduit; and said step of circulating is performed while supplying air through said first and second air inlet conduits, and the diameter d of said down comer is set at a compensated value db which is determined by the following formulae using said value da:
db=da*y
y falls in an area between the following first and second lines in a y-L plane:
first line:

| $y = -0.5L + 0.75$ | for $-1.3 \leq L < -0.715$ |
| $y = -0.15L + 1.0$ | for $-0.715 \leq L < 0$ |
| $y = -0.3L + 1.0$ | for $0 \leq L < 0.5$ |
| $y = -0.05L + 0.875$ | for $0.5 \leq L \leq 1.5$ | second line:

| $y = -0.4L + 1.0$ | for $-1.3 \leq L < 0$ |
| $y = -0.05L + 1.0$ | for $0 \leq L \leq 1.5$ | wherein L is a ratio of 2 II/D of said height II to a radius D/2 of said riser and y is a ratio db/da.

7. A heat treatment method according to claim 6 wherein said material to be heated contains at least one of Na and K, and the diameter d of said down comer is set at a compensated value dc which is determined by the following formulae using said value db:
dc=db*x
x falls in an area between the following first and second lines in a A-x plane:
first line:
$A = 714x^3 - 2256x^2 + 2424x - 882$
second line:
$A = 169.7x^2 - 346.8x + 177.1$
wherein A is a weight ratio of $Na_2CO_3$ and $K_2CO_3$ derived from Na and K contained in said material to the total dry weight of said material, and x is a ration dc/db.

* * * * *

UNITED STATES PATENT AND TRADEMARK OFFICE
CERTIFICATE OF CORRECTION

PATENT NO. : 5,426,868
DATED : June 27, 1995
INVENTOR(S) : Yamada et al.

It is certified that error appears in the above-indentified patent and that said Letters Patent is hereby corrected as shown below:

Column 13, line 39, delete "and" and insert --said--.

Column 14, line 12, delete "measure" and insert --measured--.

Signed and Sealed this

Fifth Day of September, 1995

Attest:

BRUCE LEHMAN

Attesting Officer

Commissioner of Patents and Trademarks